US 6,269,398 B1

(12) United States Patent
Leong et al.

(10) Patent No.: US 6,269,398 B1
(45) Date of Patent: Jul. 31, 2001

(54) METHOD AND SYSTEM FOR MONITORING REMOTE ROUTERS IN NETWORKS FOR AVAILABLE PROTOCOLS AND PROVIDING A GRAPHICAL REPRESENTATION OF INFORMATION RECEIVED FROM THE ROUTERS

(75) Inventors: Leon Leong, Monte Sereno; Frank Lee, Santa Clara, both of CA (US)

(73) Assignee: Nortel Networks Limited, Montreal (CA)

( * ) Notice: Subject to any disclaimer, the term of this patent is extended or adjusted under 35 U.S.C. 154(b) by 0 days.

(21) Appl. No.: 08/639,245

(22) Filed: Apr. 22, 1996

Related U.S. Application Data

(63) Continuation of application No. 08/110,412, filed on Aug. 20, 1993, now abandoned.

(51) Int. Cl.⁷ .................................................. G06F 15/173
(52) U.S. Cl. ..................... 709/224; 709/223; 709/230; 709/238; 709/243; 709/244; 703/21
(58) Field of Search ................................... 709/220, 221, 709/222, 223, 224, 225, 226, 230, 238, 243, 244; 703/21

(56) References Cited

U.S. PATENT DOCUMENTS

| | | | | |
|---|---|---|---|---|
| 4,817,080 | * | 3/1989 | Soha ........................................ 370/17 |
| 5,049,873 | * | 9/1991 | Robins et al. .................. 340/825.06 |
| 5,109,486 | * | 4/1992 | Seymour .............................. 395/200 |
| 5,185,860 | * | 2/1993 | Wu ..................................... 709/224 |
| 5,204,955 | * | 4/1993 | Kagei et al. ............................ 714/55 |
| 5,226,120 | | 7/1993 | Brown et al. ........................ 395/200 |
| 5,229,988 | * | 7/1993 | Marbaker et al. ...................... 714/47 |
| 5,231,593 | * | 7/1993 | Notess ................................. 702/180 |
| 5,237,693 | * | 8/1993 | Kiyohara et al. .................... 709/229 |
| 5,251,205 | * | 10/1993 | Callon et al. ........................ 370/392 |
| 5,295,244 | * | 3/1994 | Deu et al. ............................ 395/161 |
| 5,315,580 | * | 5/1994 | Phaal ..................................... 370/13 |
| 5,319,644 | * | 6/1994 | Liang ................................... 370/452 |

(List continued on next page.)

OTHER PUBLICATIONS

Schaidt, P., "Keep It Simple: SNMP Lets You Manage A Heterogeneous Network Today," LAN Magazine, Jul. 1990, p. 82.
ICMP Router Discovery Message, RFC 1256, 1991.*
OSPF Version 2, RFC 1247, 1991.*
*Cisco 4000 Router*, Product Brief, Cisco Systems, Inc. Menlo Park, CA, 1993.
*Optivity™ Network Management System*, Product Brochure, SynOptics Communications, Inc., Santa Clara, CA.
Naugle, M.G., *Local Area Networking*, McGraw–Hill, Inc., 1991, pp. 221–225.

*Primary Examiner*—Kevin J. Teska
*Assistant Examiner*—William Thomson
(74) *Attorney, Agent, or Firm*—Blakely Sokoloff Taylor & Zafman LLP

(57) ABSTRACT

A data communications network providing for a management of a router or the like in the network. Management of the router is accomplished though use of a logical view of a the router which view includes information on the router, protocols available on the router and interfaces available with the router. Further, commands to query routers for information and otherwise control routers in a data network are often cumbersome and difficult. Therefore, a improved method and apparatus is provided to allow such commands to be entered, by a network manager, into the router network management system and to be executed by selection of buttons on a menu. Still further, the disclosed router management system provides for true, at a glance, management of a router by allowing a single icon to be used to quickly review the status of the router and for the icon to be expanded into a full window to provide for further information on the status of the router.

26 Claims, 16 Drawing Sheets

U.S. PATENT DOCUMENTS

| | | | | |
|---|---|---|---|---|
| 5,367,635 | * | 11/1994 | Bauer et al. | 709/221 |
| 5,375,070 | * | 12/1994 | Hershey et al. | 709/224 |
| 5,432,907 | * | 7/1995 | Picazo, Jr. et al. | 709/249 |
| 5,434,863 | * | 7/1995 | Onishi et al. | 370/402 |
| 5,471,399 | * | 11/1995 | Tanaka et al. | 707/103 |
| 5,471,617 | * | 11/1995 | Farrand et al. | 709/100 |
| 5,490,252 | * | 2/1996 | Macera et al. | 709/249 |
| 5,500,934 | * | 3/1996 | Austin et al. | 395/326 |
| 5,515,376 | * | 5/1996 | Murthy et al. | 370/402 |
| 5,546,540 | * | 8/1996 | White | 709/223 |
| 5,596,719 | * | 1/1997 | Ramakrishnan et al. | 709/241 |
| 5,963,556 | * | 10/1999 | Varghese et al. | 370/401 |

* cited by examiner

192.9.200.1

Poll Time Interval  20   △▽   SNMP Timeout Time  15   △▽

Performance Yellow  0   △▽   Performance Red  10   △▽

|  | Fault | | Performance | |
|---|---|---|---|---|
| Poll | YELLOW (%) | RED (%) | YELLOW (%) | RED (%) |
| ☑ IP | 0 | 1 | 1 | 5 |
| ☑ IPX | 0 | 1 | 1 | 5 |
| ☑ TokenRing0 | 0 | 1 | 1 | 5 | ☐ SWITCH |
| ☑ Ethernet0 | 0 | 1 | 1 | 5 | ☐ SWITCH |
| ☑ Serial0 | 0 | 1 | 1 | 5 | ☐ SWITCH |
| ☑ Ethernet1 | 0 | 1 | 1 | 5 | ☐ SWITCH |
| ☑ Ethernet2 | 0 | 1 | 1 | 5 | ☐ SWITCH |
| ☑ Serial1 | 0 | 1 | 1 | 5 | ☐ SWITCH |
| ☑ Fddi0 | 0 | 1 | 1 | 5 | ☐ SWITCH |
| ☑ Fddi1 | 0 | 1 | 1 | 5 | ☐ SWITCH |

Read Community String: public
Write Community String: *****
Telnet Password: 
Save to File: rtr134.177.165.1.ctg                    (Apply)
(Load)   from file: rtr134.177.165.1.ctg
(Load Telnet Commands)   from file: /usr/lnms/help/ev_rtr  ▷
Server: 134.177.104.22

*FIG. 5*

```
                                                    ┌─ 1201
                                                   /
┌─────────────────────────────────────────────────┐
│  ◉         192.9.200.1                          │
├─────────────────────────────────────────────────┤
│ Thu Mar 4 11:15:54 1993                         │
│ IP ICMP                                         │
│                                                 │
│ ICMP messages received                  20438475│
│ ICMP errors                                    0│
│ ICMP unreachable destinations received     72507│
│ ICMP time exceeded messages received          18│
│ ICMP source quenches received                 14│
│ ICMP redirects received                      202│
│ ICMP echo requests received             20365585│
│ ICMP messages transmitted               20623539│
│ ICMP unreachable destinations transmitted 256905│
│ ICMP time exceeded messages transmitted      116│
│ ICMP source quenches transmitted               0│
│ ICMP redirects transmitted                   911│
│                                                 │
│            ( Clear Counters )                   │
│ ( Save )  to file: rtr.192.9.200.1.rep          │
└─────────────────────────────────────────────────┘
```

*FIG. 12*

```
                                                    ┌─ 1501
                                                   /
┌─────────────────────────────────────────────────┐
│  ◉         192.9.200.1                          │
├─────────────────────────────────────────────────┤
│ Thu Mar 4 11:15:54 1993                         │
│ Interface 2 Configuration                       │
│                                                 │
│ Number                                         2│
│ Physical address                    00000c00a2df│
│ Description                             Ethernet0│
│ Type                               ethernet-csmacd│
│ Speed                                   10000000│
│ Maximum frame size                          1500│
│ Administrative status                         up│
│ Operational status                            up│
│ Time of operational status change  Thu Mar 4 11:16:43 1993│
│ Reason for status change                      up│
│                                                 │
│ ( Save )  to file: rtr.192.9.200.1.rep          │
└─────────────────────────────────────────────────┘
```

*FIG. 15*

IP Routing Table — 192.9.200.1

| Destination | Interface Number | Route Metric 1 | 2 | 3 | 4 | Next Hop | Route Type | Gateway Protocol | Route Age | Route Mask | Parallel Route Count | Route Usage |
|---|---|---|---|---|---|---|---|---|---|---|---|---|
| 192.9.200.3 | 2 | 1 | 1 | -1 | -1 | 0.0.0.0 | direct | local | 0 | 255.255.255.0 | 0 | 0 |
| 192.9.200.4 | 2 | 1300 | 10000 | 3000 | 1 | 134.177.110.1 | direct | ciscolgr | 43 | 255.255.255.0 | 1 | 0 |
| 192.9.200.5 | 2 | 1300 | 10000 | 3000 | 1 | 134.177.110.1 | direct | ciscolgr | 43 | 255.255.255.0 | 1 | 0 |
| 192.9.200.6 | 2 | 1300 | 10000 | 3000 | 1 | 134.177.110.1 | direct | ciscolgr | 43 | 255.255.255.0 | 1 | 0 |
| 192.9.200.7 | 2 | 1300 | 10000 | 3000 | 1 | 134.177.110.1 | direct | ciscolgr | 43 | 255.255.255.0 | 1 | 0 |
| 192.9.200.9 | 2 | 1300 | 10000 | 3000 | 1 | 134.177.110.1 | direct | ciscolgr | 43 | 255.255.255.0 | 1 | 0 |

1401

(Get Again) 1402 (Add) 1403 (Delete) 1404 (Change) 1405 (Find) (Apply) 1406

(Save) to file: rtr.192.9.200.1.rep     Total entries 6

Thu Mar 4 11:15:54 1993
Interface 1 Fault Statistics

| | |
|---|---:|
| Interface number | 1 |
| Physical address | 000028444c00 |
| Type | iso88025-tokenring |
| Input frame errors | 0 |
| Output errors | 0 |
| Unknown protocol frame input errors | 0 |
| Number of interface resets | 1216 |
| Number of interface restarts | 0 |
| Time of last good input | 0:0:0:0 |
| Runt Frame input errors | 0 |
| Giant frame input errors | 0 |
| Checksum frame input errors | 0 |
| Misaligned input errors | 0 |
| Input frame overrun | 0 |
| Input frame ignored | 0 |
| Input frame aborted | 0 |
| Time of last good output | 0:0:0:0 |
| Time of last error output | 0:0:0:0 |

(Clear Counters)
(Save)  to file: rtr.192.9.200.1.rep

Thu Mar 4 11:15:54 1993
Interface 1 Fault Statistics

| | |
|---|---:|
| Interface number | 1 |
| Physical address | 000028444c00 |
| Type | iso88025-tokenring |
| Speed | 4000000 |
| Single destination input frames | 40452866 |
| Multicast input frames | 1932315 |
| Discards input frames | 33 |
| Discards output frames | 0 |
| Octets input | 2794036289 |
| Octets output | 3436649415 |
| Single destination output frames | 24812562 |
| Multicast output frames | 2277839 |
| Average input packets/sec | 15 |
| Average output packets/sec | 12 |
| Average input bits/sec | 17000 |
| Average output bits/sec | 10000 |

(Clear Counters)
(Save)  to file: rtr.192.9.200.1.rep

METHOD AND SYSTEM FOR MONITORING REMOTE ROUTERS IN NETWORKS FOR AVAILABLE PROTOCOLS AND PROVIDING A GRAPHICAL REPRESENTATION OF INFORMATION RECEIVED FROM THE ROUTERS

This is a continuation of application Ser. No. 08/110,412, filed Aug. 20, 1993, now abandoned.

COPYRIGHT NOTICE

A portion of the disclosure of this patent document contains material which is subject to copyright and/or mask work protection. The copyright and/or maskwork owner has no objection to the facsimile reproduction by any one of the patent disclosure, as it appears in the Patent and Trademark Office patent files or records, but otherwise reserves all copyright and/or maskwork rights whatsoever.

BACKGROUND OF THE INVENTION

1. Field of the Invention

The present invention relates to the field of computer networking, specifically to the field of monitoring, viewing and altering information regarding devices coupled with a computer network.

2. Description of the Related Art

The present invention relates to methods and apparatus for monitoring, viewing and altering information regarding devices coupled with or within a computer network. In particular, the present invention is directed to a monitoring, viewing and altering information regarding routers which are commonly utilized in computer networks. It is important in management of data networks to provide the network manager (e.g., a person assigned the responsibility for overseeing the operations and overall health of the network) with information on various devices in the network.

Routers

Routers are generally characterized in that such devices provide for interconnecting portions of data networks and provide for message packet routing and forwarding between such multiple networks. Routers generally operate at the network layer of the ISO protocol.

Routers are available from a number of vendors. For example, Cisco Systems, Inc. provides a family of routers including, by way of example, the Cisco 4000 router. Typically, routers (such as the Cisco 4000 router) include both hardware and software components. In providing information on a router to a network management system, it is important to provide information on both the hardware and software components. For example, it might be desirable to provide the network management system with information on the router, on the various network protocols available on the router, and on the various interfaces available on the router.

SNMP

One relatively standardized network management tool is the Simple Network Management Protocol (SNMP). This protocol provides for three elements: (1) the manager, (2) the agent, and (3) the management information base (MIB). SNMP is described in greater detail in, for example, Naugle, *Local Area Networking*, McGraw-Hill, Inc., 1991, pp. 221–225. SNMP is also described in Schnaidt, Keep it Simple: SNMP lets you manage a heterogeneous network today, LAN Magazine, July 1990, pg 82.

Generally, SNMP may be characterized as a request-response protocol which contains a manager and an agent. The agent is typically located on a network device (e.g., a router). The agent is generally passive and performs operations responsive to polling from a manager. The one exception to the rule of the agent being passive and simply responding to requests from the manager is that an agent will generally communicate to the manager when certain "trap" conditions are detected. In any event, the agent generally acts gather information about its own device's internal workings and the network and stores the information in the MIB. Using a connectionless protocol the manager requests and obtains information from the MIBs.

Sometimes, the device executing the management applications that are used to poll the agents on the network is referred to as the "management station" and the devices which contain the agents are referred to as "managed elements".

There exists certain standards for the MIB as well as "extensions" to the MIB which allows each network device vendor to provide its specific information for its own devices.

Although SNMP provides for the ability to poll a device implementing an SNMP agent, SNMP does not provide standards for how information received from the agent is to be displayed or presented to the network manager.

Many commercially available routers have implemented SNMP agents.

Telnet

Although significant information is available from network devices, such as routers, using SNMP, certain information may not be available using the standard SNMP interface. For example, diagnostic information on certain routing tables may not be available using SNMP. However, many network devices, including many routers, provide for remote diagnostic access using the standard Telnet protocol. The Telnet protocol provides a terminal emulation capability allowing a network manager to issue commands (such as commands requesting diagnostic information) from other devices in the network Importantly, the Telnet protocol provides information to network management devices in an ASCII character format. Thus, although much information may be obtained using the Telnet protocol, reading and understanding the information presented typically requires significant training and effort. Further, it typically requires significant training and effort to learn the various commands which may be used to obtain information from a device using the Telnet protocol.

Physical representation of network devices

One well-known example of tool which provides information to a network manager is the Expanded View™ network management module available from SynOptics Communications, Inc., the assignee of the present invention. Generally, the Expanded View network management module provides for a graphical display of a physical view of devices in a network. For example, a concentrator hub in a data network may be displayed. The concentrator hub physically may include, for example, module cards which are inserted into the concentrator hub. The concentrator hub and the various module cards may include status indicators such as LEDs which provide status information on the cards and the hub. In many circumstances, it is useful to be able to obtain the status information which is provided by the status indicators as well as to be able to physically view the hub to see what modules are currently in the hub and to see which ports on those modules may have existing physical connections. However, the concentrator hub is often located physically remote from the network manager. Therefore, the Expanded View network management module provides a physical representation of a selected concentrator in the form of a graphical image complete with representation of each of the installed modules and the various status indicators (i.e., LEDs) provided on the module. This physical representation may be provided on network management station which may located in a location physically convenient for access by the network manager. The Expanded View network management module is one module in the Optivity™ network management system, also available from SynOptics Communications, Inc.

U.S. Pat. No. 5,226,120 (the '120 patent) titled "Apparatus and Method for Managing the Status of a Local Area Network", which patent is assigned to the assignee of the present invention and is incorporated herein by reference, describes certain aspects of displaying physical representations of concentrator hubs in greater detail. For example, FIG. 7 of the '120 patent (which is discussed, for example, at column 8, line 41 et seq.) illustrates an exemplary pop-up detailed window which is displayed on a network management station when the exemplary concentrator is selected. As is described in the patent, the concentrator is displayed as a physical representation of the actual concentrator and includes, in the example shown in FIG. 7 of the '120 patent, thirteen plug in modules represented as image sections 60a–60m in the figure. At column 9, line 13 et seq. it is discussed that status information is shown in the form of the LED lights.

Importantly, the Expanded View network management module and the concentrators it is used to manage are generally characterized by two factors:

(1) the Expanded View network management module and the concentrators are both manufactured by, or in cooperation with, a single manufacturer (i.e., SynOptics). This allows SynOptics to control and design how information is exchanged between the Expanded View module and the concentrators; and (2) a representation of a physical view of a concentrator hub conveys significant information to the network manager because of, for example, the ability to display representations of status information in the form of LEDs. However, the displayed physical representation does not readily lend itself to representation of certain devices which may be attached to networks, such as routers, which have both hardware and software components to be monitored and which do not necessarily provide physical indications of status, such as LEDs.

OBJECTS OF THE INVENTION

It is an object of the present invention to provide for management of routers and the like in a data network.

It is further an object of the present invention to provide for a graphical user interface which allows for a relatively easy undemanding of the status and capabilities of routers coupled with the network.

These and other objects of the present invention will be understood with reference to the detailed description of the preferred embodiment and the accompanying drawings.

SUMMARY OF THE INVENTION

The present invention relates to methods and apparatus providing for management of routers and the like in a data network. Generally, the present invention provides for display of a logical representation of a router, including information on the available protocols and interfaces and provides for allowing a network manager to issue commands, such as Telnet commands to the router.

Routers often are utilized in data networks to operate between multiple local area networks and to allow communication of data ftom one local area network to another local area network. It is important in managing data networks, including managing of routers within the networks, to provide for feedback to a network manager regarding the status of the various devices in the network (e.g., the routers). Tools such as the SNMP protocol are available to assist in such management tasks; however, SNMP does not provide an easy to use interface allowing viewing and responding to the information received from the devices in the network. Further, tools such as Telnet provide access to information regarding routers; however, the information is presented in a textual format which requires training and time to interpret Therefore, the present invention provides for an interface allowing a network manager to easily view the status of a router and to issue commands, such as Telnet commands, to the router.

Further, the present invention provides a unique method of polling routers to obtain information on the various protocols available on a router.

Still further, the present invention provides an improved interface allowing a network manager to easily store and execute Telnet commands.

Finally, the present invention provides a method and apparatus allowing for "iconifying" a router network management session allowing true, at a glance, review of the status of a router.

These and other aspects of the present invention will be discussed in greater detail with reference to the detailed description and the accompanying figures.

BRIEF DESCRIPTION OF THE DRAWINGS

FIG. 5 is an illustration of the set up window of the network management system of the described embodiment.

FIG. 12 is an illustration of a ICMP window as may be displayed by the network management system of the described embodiment.

FIG. 14 is an illustration of an exemplary routing table display window as may be displayed by the network management system of the described embodiment.

FIG. 15 is an illustration of an interface configuration window as may be displayed by the network management system of the described embodiment.

FIG. 16 is an illustration of an interface fault statistics window as may be displayed by the network management system of the described embodiment.

FIG. 18 is an illustration of an interface fault statistics window as may be displayed by the network management system of the described embodiment.

Figure 1:
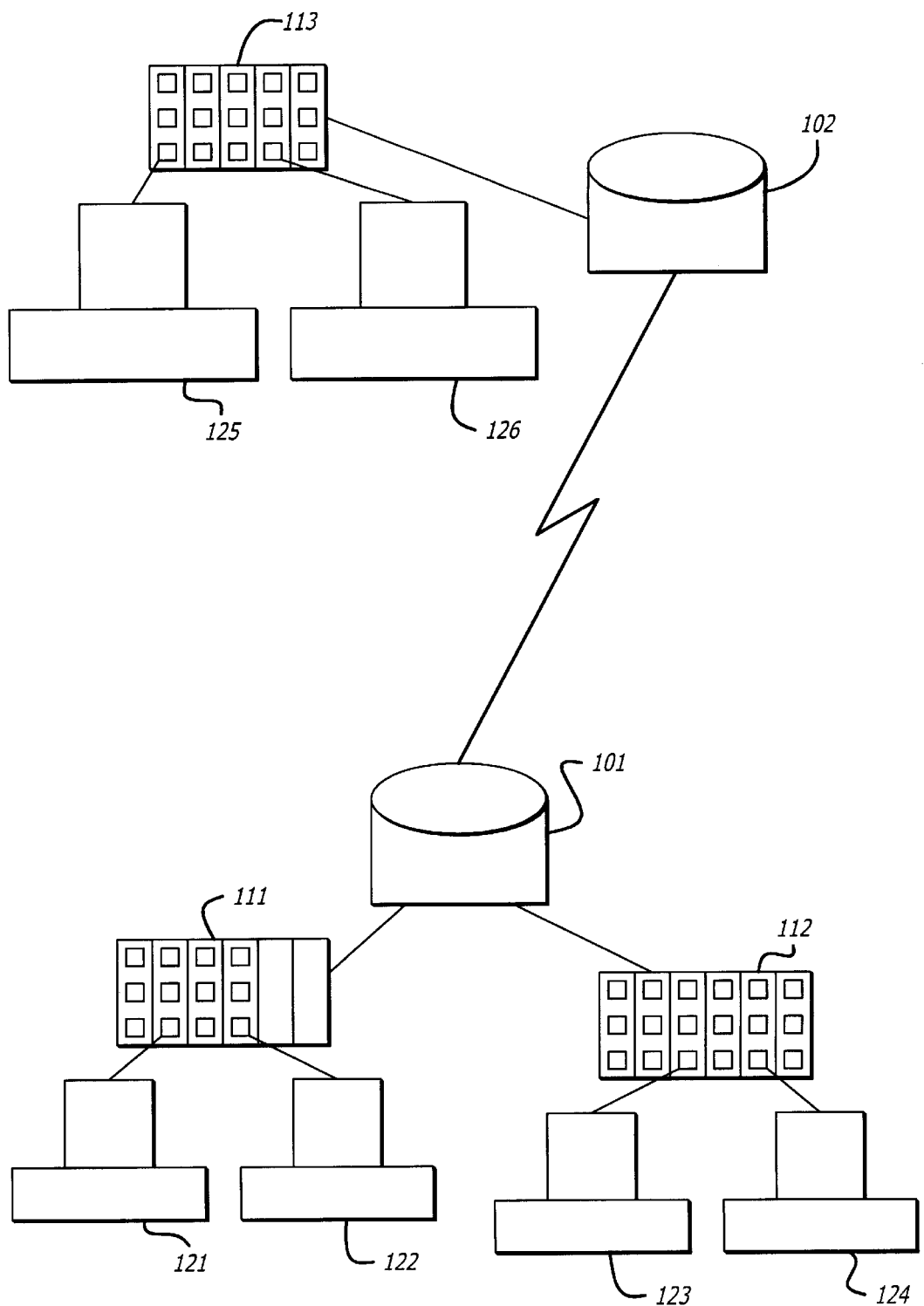
FIG. 1 illustrates a network including routers as may be managed by the present invention.

For ease of reference, it might be pointed out that reference numerals in all of the accompanying drawings typically are in the form "drawing number" followed by two digits, xx; for example, reference numerals on FIG. 1 may be numbered 1xx; on FIG. 3, reference numerals may be numbered 3xx. In certain cases, a reference numeral may be introduced on one drawing and the same reference numeral may be utilized on other drawings to refer to the same item.

DETAILED DESCRIPTION OF THE PREFERRED EMBODIMENT

What is described herein is a method and apparatus providing for improved management of a router or the like in a data communications system. In the following description, numerous specific details are set forth in order to provide a thorough understanding of the present invention. It will be obvious, however, to one skilled in the art that the present invention may be practice without these specific details. In other instances, well-known circuits, structures and techniques have not been shown in detail in order not to unnecessarily obscure the present invention.

I. Overview of Present Invention

The described embodiment of the present invention provides an improved user interface for a network management system which allows a network manager to see, at a glance, the configuration of a router, whether faults are occurring on the router, and the utilization and/or availability of various components of the router.

Importantly, routers typically involve both hardware and software components. Therefore, especially with respect to the software components, a physical view of the router does not provide complete information on the router. For example, physically examining the router typically does not provide information as to what protocols are supported by the router. Further, typical routers do not provide complete status information in the form of LED displays or the like. Therefore, as can be appreciated, a network manager requires more information than can be gained from an examination of the physical router itself or from examination of a representation of the physical router, for example on a computer display. As was discussed in the prior art section, one prior art method of providing information on a router to network manager is to provide the network manager with textual information describing the router and its status. However, this information may be cumbersome, difficult to read, and require significant training before an individual is proficient at obtaining, reading and understanding the information.

Therefore, as one aspect of the present invention, a logical view of a router is presented to the network manager which allows the network manager to view status and configuration information on the router essentially at a glance. Information from the router is generally obtained using the SNMP protocol. The router network management system is implemented utilizing a client-server model. In addition, to use of the SNMP protocol, the described embodiment utilizes Telnet commands to obtain certain information which may not be available through the SNMP protocol.

Further, as has been stated, use of facilities such as Telnet often require significant knowledge of command syntax. The present invention provides an improved user interface allowing interaction with a router through use of Telnet commands while minimizing required user knowledge.

Finally, as will be described in greater detail below, certain types of information, specifically information on which protocols are supported by the router, is not directly available from at least certain commercially available routers. Therefore, the present invention discloses methods and apparatus for obtaining such information in a network management system.

One embodiment of the present invention is available from the assignee of the present invention, SynOptics Communications, Inc. as the "RouterMan™ network management application". Aspects of this embodiment of the present invention are described in detail with reference to "Routerman 2.0 User's Guide" published by SynOptics Communications, Inc.

II. Overview of an Exemplary Network

FIG. 1 illustrates an exemplary network such as may be utilized by the present invention. As illustrated, the data network comprises a plurality of stations or terminals 121–126. The stations 121–126 may be, by way of example, personal computers or workstations. The stations may also be printers, file servers, or virtually any other device capable of communicating on the network. In the illustrated data network, the stations 121–126 are each coupled in communication with a network concentrator 111–113 (specifically, as illustrated, stations 121 and 122 are coupled with concentrator 111; stations 123 and 124 are coupled with concentrator 112; and stations 125 and 126 are coupled with concentrator 113). Of course, in alternative embodiments the number of stations coupled with each concentrator may, and probably will, vary. Further, in certain embodiments, concentrators may not be utilized at all and the various stations may be simply coupled in communication with each other. Each of the concentrators may represent a logically separate local area network and the various local area networks may implement different types of networking standards (e.g., Ethernet, Token Ring, FDDI, etc.)

The various local area networks may be coupled to a router, such as routers 101 and 102. The routers may, for example, be routers which are commercially available from Cisco Systems, Inc. such as the Cisco 4000 router. The routers provides interfaces to the various local area networks.

III. Logical View of the Router Network Manager of the Present Invention

One or more of the stations 121–126 may be utilized as a network management station and provide network management information to a network manager and allow the network manager to control the network from a central location. In the preferred system, the network management system actually is comprised of two separable modules: (1) a router client module; and (2) a router server module. The router client module and router server module may be executed on separate physical computers or they may reside and be executed on the same physical computer.

Figure 2:
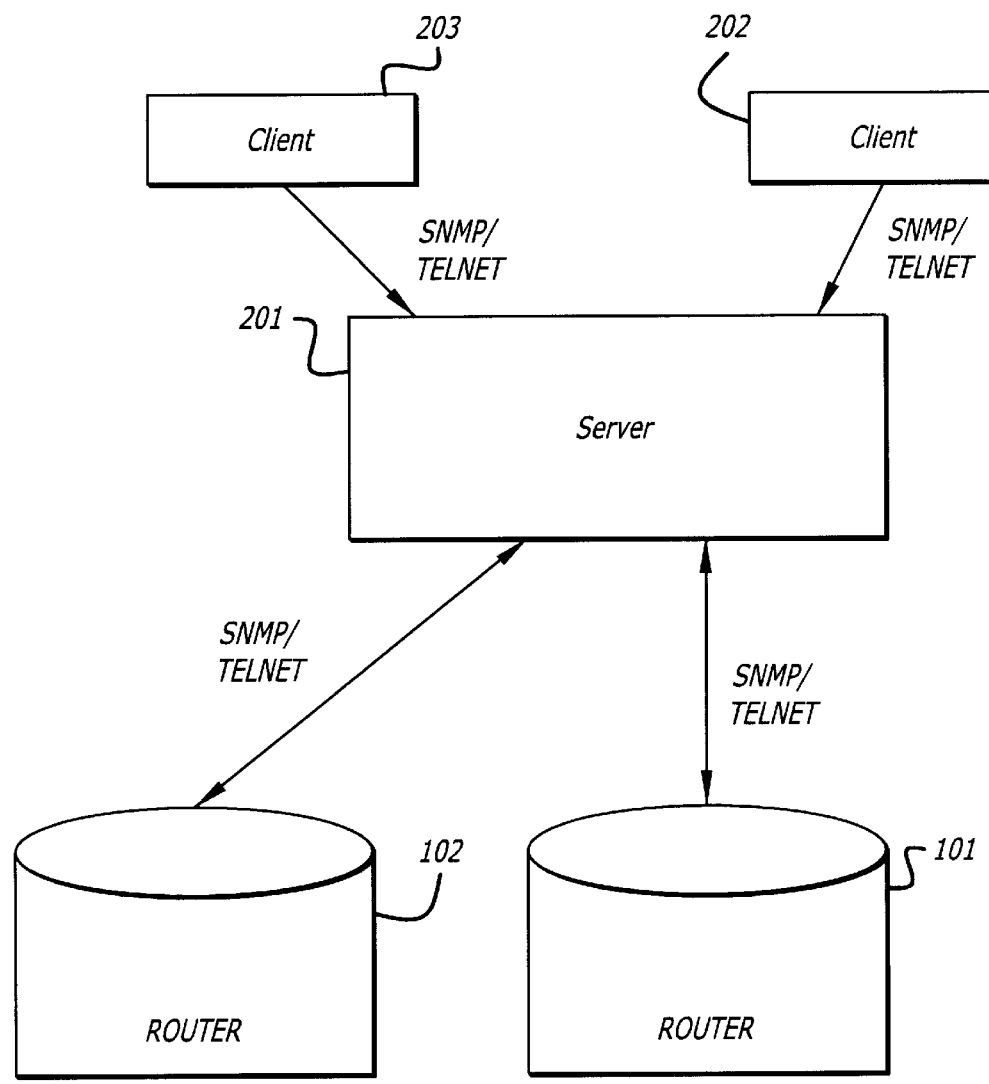
FIG. 2 illustrates a logical model for the router network management system of the present invention.

FIG. 2 illustrates the client-server model used for implementation of the described embodiment of the present invention in greater detail. The implementation of the described embodiment using a client-server architecture allows multiple clients (e.g., client 202 and 203 ) to access a single server (e.g., server 201). In this way, for example, network administrators at various physical locations can view the status of a router. In any event, as illustrated by FIG. 2, each client 202–203 communicates with a server 201. The server then communicates with the routers, e.g., routers 101 and 102.

When a client, such as client 202 or 203, requests data, the server 201 collects and reduces the data from the agents executing on the selected router (e.g., router 102 or 103). The client 202, 203 then receives the data from the server 201. Using the server 201 to respond to clients 202, 203 saves network bandwidth and reduces CPU cycles a router spends responding to management stations.

In the described embodiment, the client then provides for display of the data.

Communication between the client and server and between the server and router is generally accomplished in the described embodiment utilizing the SNMP protocol. Requests are made from the client to the server by the client polling the server at specified intervals. In the described embodiment, the default polling interval for client-to-server polling is 15 seconds and this interval is adjustable by the network manager. The default polling interval for server-to-router polling is 20 seconds in the described embodiment and this interval is not adjustable by the network manager.

In addition and as will be described in greater detail below, the client 202, 203 also issues Telnet commands directed to the routers.

Initiation of the network management process will be described in greater detail below. However, it is worthwhile briefly reviewing the process here. A client 202, 203, when first invoked by a user, specifies to the server 201 the router it is interested in managing and for providing the appropriate SNMP command string. The client is also responsible for storing historical information and for locally managing certain values (e.g., client-to-server polling values and threshold values used for determining the point at which certain buttons in the main window 400 change from one color, e.g., normal, to a warning color, e.g., yellow, to a critical color, e.g., red).

Before continuing with a description of the initiation of a network management session, it should be stated that, although the described embodiment is implemented utilizing a client-server model, the present invention may be implemented using a single process for providing both the client and server functionality. Generally, what is required is a processor for processing information including commands received from the network manager and information received from the routers, as well as for controlling display of such information and a display for displaying the information. In addition, as has been mentioned, at least for purposes of storing historical information, some form of memory (e.g., computer disk) is useful. Configuration of such a system is well within the skill of the person ordinarily skilled in the relevant art. The described system is executed utilizing a Sun SPARCstations with 2 megabytes or greater of free disk space and at least 16 megabytes of RAM.

IV. Overall Flow Diagram of a Network Management Session

Figure 3A:
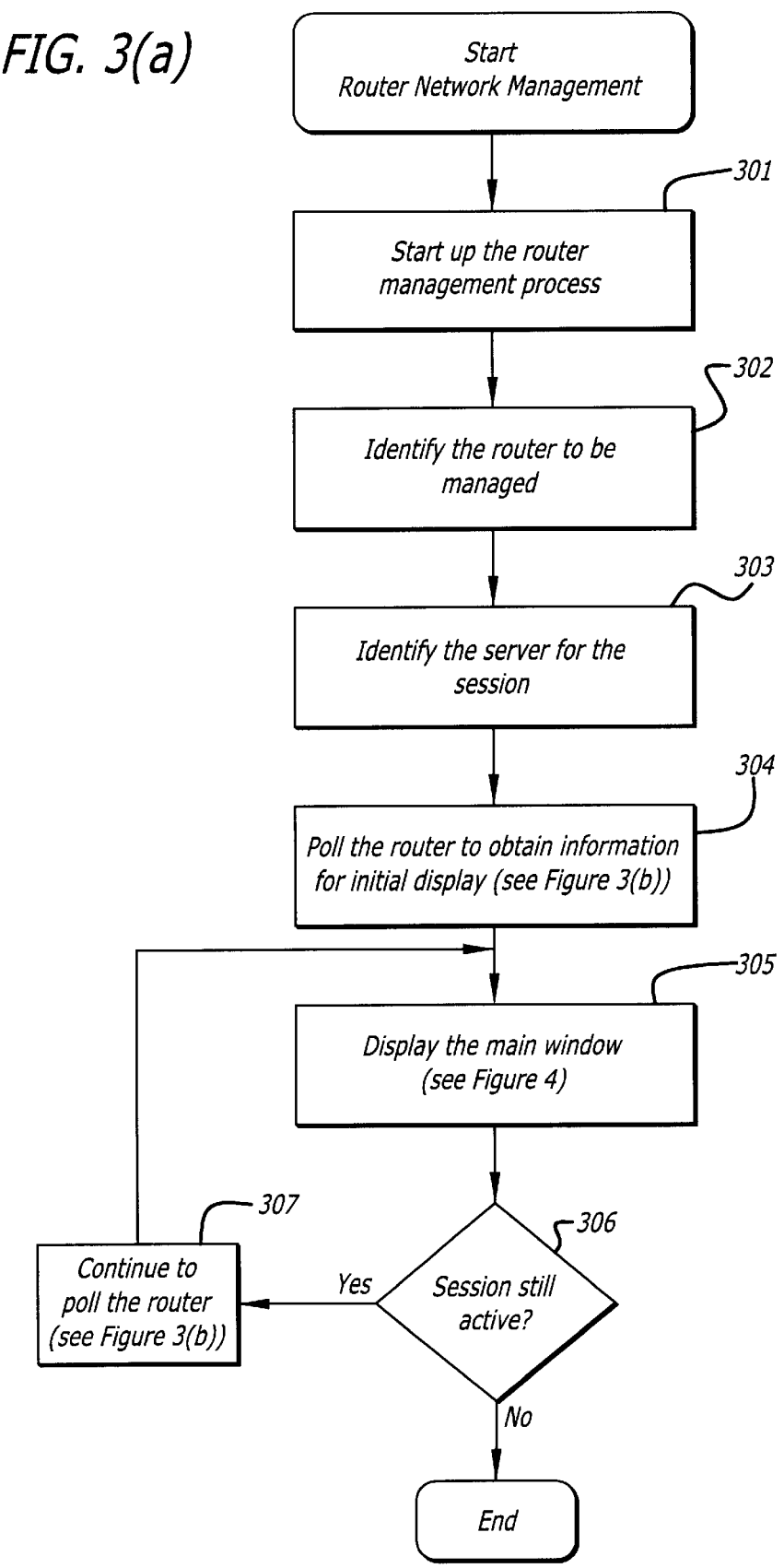
FIG. 3(a) is an overall flow diagram of the network management process of the present invention.

FIG. 3(a) provides an overall flow diagram of the described router network management system. Initially, the router management process is initiated, block 301. In the described embodiment, this can be accomplished by simply entering a command (in particular the command is "ev_rtr") from a command shell. Alternatively, if the network management system is installed on a network management station running the Optivity network management system a button for initiating the router network management process is provided in a pop-up tools menu.

Next, a router to be managed must be identified, block 302. This can either be done by providing information identifying the router when entering a command at the command line or the system provides a dialog box requesting information identifying the desired router. The router may be identified by entering either the router IP address or the router host name. In addition, the particular server, e.g., server 201, is identified by IP address or host name, block 303.

The router is then polled to obtain information for initial display, block 304. As was discussed, in the described embodiment polling of the router is accomplished by the client polling the server and the server polling the router using the SNMP protocol. The polling process will be described in greater detail with reference to FIG. 3(b).

Next, the main window 400 is displayed, block 305. The main window 400 is described in greater detail with reference to FIG. 4. Generally, the main window 400 provides a logical representation information about the router including illustrating the general configuration of the router (e.g., protocols and interfaces available), router fault information and performance information.

As long as the session stays active, block 306, the server continues to poll the router and the client continues to poll the server on a period basis as specified by the respective polling intervals, block 307.

Figure 3B:
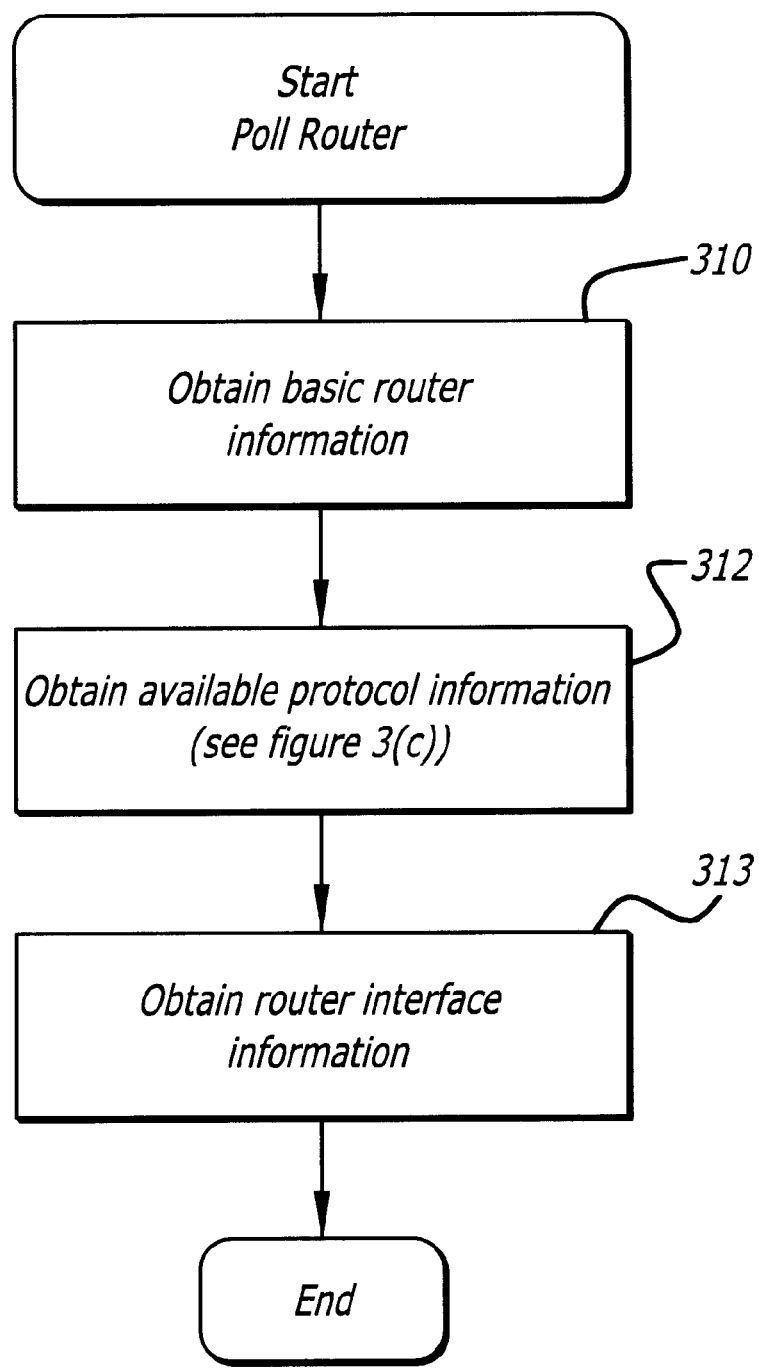
FIG. 3(b) is a flow diagram illustrating the information polled by the network management system from the router.
Figure 3C:
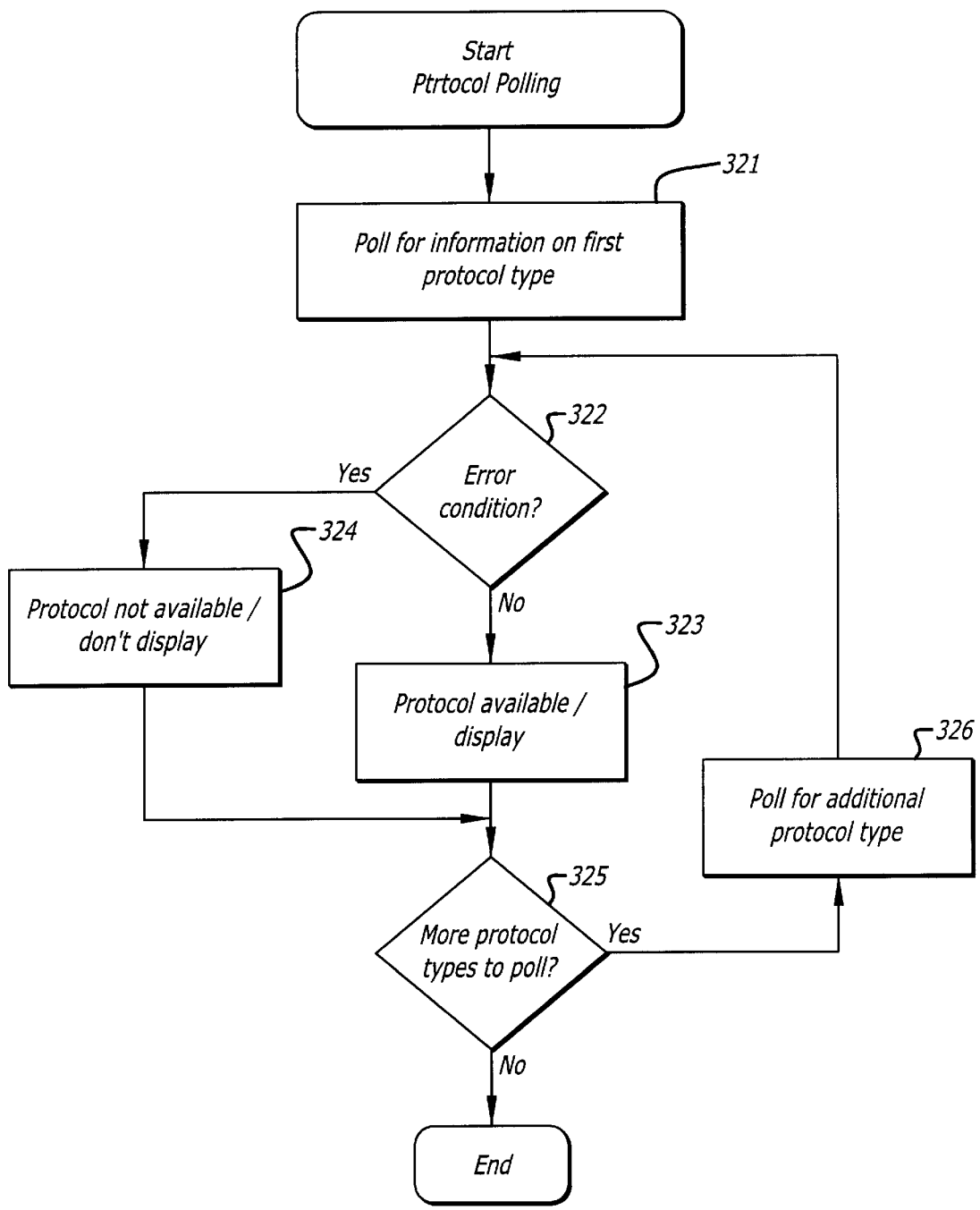
FIG. 3(c) is a flow diagram illustrating polling for protocol information as may be accomplished by the present invention.

Turning now to FIG. 3(b), the basic process for polling routers is illustrated. There are three types of information which are obtained from the router through SNMP transactions provided by the server to the router requesting MIB objects. Generally, one MIB object is provided for each row of information on the main window 400 (again, the main window 400 is illustrated with reference to FIG. 4 and each of the rows will be discussed in greater detail below.

There are three types of information which the router network management system polls for: (1) basic information on the router, block 310; (2) information on available protocols, block 311; and (3) information on router interfaces, block 313.

It is worthwhile describing the polling process in somewhat greater detail. Generally, this process provides for regular polling for entities and is implemented by first setting timers for entities to be polled. The entities on then polled at the specified interval. Because there may be a large number of entities to be polled at the same time, polling lists are organized into groups—in the described system there are two groups (1) for buttons that are always on the main window 400 (and which will be described in greater detail below in connection with FIG. 4) and the other for popup window entities that need to be polled only when the window is invoked.

Further, at least because of the possible number of router interfaces (up to 32 interfaces in the described embodiment), it is necessary to control the number of polling requests. In the described embodiment, this issue is alleviated to some extent by both spreading out the polling requests in time and by combining MIB objects into single SNMP Get requests in order to reduce the number of packets to be sent out.

In spreading out the polling requests, the described system utilizes a priority flag to regulate the order for polling. Priority is set at system initiation time the same for all polling requests in a group. Generally, each group will provide for no more than 12 packets (or the equivalent of 4 rows of buttons on the main window 400 where each row has three buttons and each button causes one packet to be sent.) In this method only entities with a priority of 1 are sent out during any given polling cycle. All other entities will then have their priority raised by one level. The polled entity will be set temporarily to a no poll state until a response is received from the router. The entity then has its priority set to the lowest priority level. Thus priority is effectively passed from group to group in a round robin order.

Generally, groups of MIB objects are requested in a single SNMP packet to further reduce traffic flow. In the described embodiment, for the main window 400, MIB objects are grouped by row on the main window 400.

V. Obtaining Protocol Information

As one important aspect of the present invention, it is noted that many commercially available routers do not directly provide information stating which protocols are supported by those routers responsive to SNMP protocol requests. Therefore, the present invention has developed a technique for obtaining such information in order to provide for display of information showing the protocols installed on a router being managed by the described process. This process illustrated in greater detail with reference to FIG. 3(*c*).

The described embodiment polls for six protocol types: (1) Internet Protocol (IP); (2) DECnet protocol (DN); (3) Xerox Network System (XNS); (4) AppleTalk (AT); (5) Novell Internet Packet Exchange (IPX); and (6) Banyan VINES.

Generally, the polling process is characterized in that the router is polled for information on each of the various protocol types. Assuming the protocol type is supported by the router, information is returned from the router on the protocol type and eventually will be displayed on the main window 400. However, as one important aspect of the present invention, because there is no preset handshake between the described router network management system to provide information specifying what protocols are available, the present invention determines what protocols are available through the described polling process by polling for each of the protocol types and, when a protocol type is not available on the router, recognizing the unavailability of a protocol by the return of an error message from the router responsive to the polling request.

Turning to FIG. 3 this process is illustrated in an overall flow form. Initially, the router is polled for a first protocol type (e.g., one of the six types listed above), block 321. If there is no error condition detected, block 322, the information on the protocol is received in the form of an MIB object and the system assumes the protocol is available on the router, block 323. The information is eventually displayed on the main window 400 as discussed in connection with FIG. 3(*a*), block 305. However, if an error condition is detected, it is assumed that the protocol is not available and no information on that protocol is displayed, block 324. If there are more protocols to poll (e.g., all six have not yet been polled), block 325, polling is done for the next protocol type, block 326.

VI. Display of a Logical View of a Router—The Main Window 400

Having discussed generally how information is obtained for display, it is now worthwhile to turn to the main window 400 and discuss in greater detail the logical view of information regarding the router that is made available to the network manager.

General overview of the main window

Figure 4:
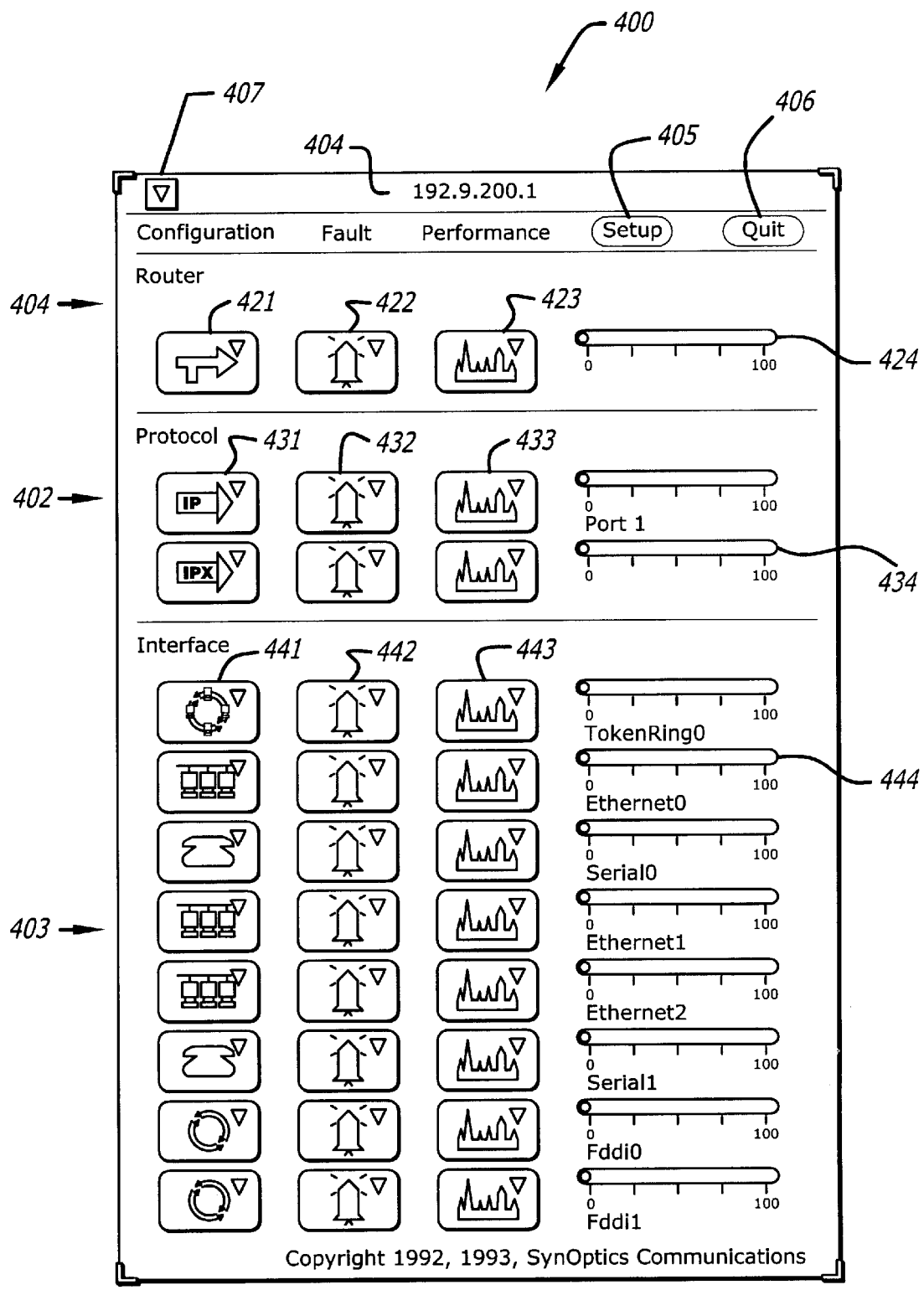
FIG. 4 is an illustration of the main window of the network management system of the described embodiment.

The main window 400 is illustrated with reference to FIG. 4. Generally, the main window 400 shows information in three categories of information: (1) general information on the router in area 401; (2) protocol information in area 402; and (3) interface information in area 403.

Each of the areas 401–403 on the main window 400 include three columns for logically displaying information. Each area has one or more rows as will be described. The first column is a button which generally provides configuration information for the router, protocol or interface represented by the button; the second column is a button providing fault information for the router, protocol or interface; the third column includes a button providing performance information for the router, protocol or interface and a graph providing further performance information for the router, protocol or interface.

Generally, the button colors are altered based on poling of the router in order to provide the network manager with "at a glance" feedback on the overall status of the router. Further, the various buttons may be selected by the network manager to obtain more detailed information on the status of the router or to otherwise control router functions. This will be discussed in greater detail below. In the described embodiment, the colors of the buttons is interpreted in accordance with Table I, below:

TABLE I

| | Meaning for the: | | |
|---|---|---|---|
| Button Color | Router area 401 | Protocol area 403 | Interface Area 403 |
| Red | Router failed to respond | Protocol fault limits exceeded | Interface performance below acceptable levels |
| Yellow | Router performance minimal | Protocol traffic nearing fault thresholds | Interface performance below normal |
| Green | Router responding normally | Protocol faults within acceptable limits | Interface functioning within acceptable limits |
| Blue | A change in status has occurred; information is recorded in the fault log | A change in status has occurred; information is recorded in the fault log | A change in status has occurred; information is recorded in the fault log |

Before turning to a more detailed description of each of the areas 401–403, it is worthwhile to provide discussion of some other features of the main window 400. At the top of the main window 400, the address of the router being monitored is displayed. The top area of the main window 400 also comprises a set up button which allows the network manager to access the setup window 500 which will be described in greater detail with reference to FIG. 5. Further, a "quit" button 406 is provided which allows the network manager to quit or terminate the session.

"Iconifying" a router management session

Finally, but as one important and inventive aspect of the present invention, a triangle button 407 is provided. When the network manager "clicks" on the triangle button 407, the main window 400 is removed from display and a small icon representing the session appears at the bottom of the display screen. The small icon can then be moved to any desired location on the display screen—preferably a location where it will not be obscured by other windows or information. The network manager can then simply monitor the color of the icon (in accordance with the interpretations given for the various colors in Table I) in order to obtain a summary of the status of the router. Assuming the router is responding normally and the available protocols and interfaces are acting within acceptable limits, the icon will appear as green. Changes in the status of the router, protocols or interfaces will cause the color of the icon to be changed to red, yellow or blue dependent on the nature of the change in status. The network manager can then click on the icon to again display the main window 400.

Detailed description of the router area 401 on the main display 400

Figure 6:
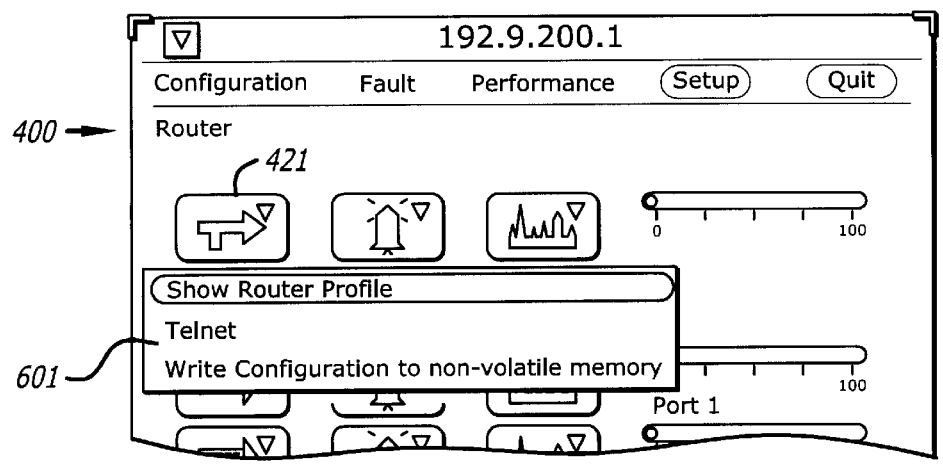
FIG. 6 is an illustration of pop up menus as may be utilized by the present invention.

Turning now the areas 401–403 of the main display 400, area 401 includes three buttons 421–423 and a router CPU utilization graph 424. When any of the buttons 421–423 are selected by the network manager, a menu with additional options for selection is displayed. For example, FIG. 6 illustrates the menu 601 displayed when the router button 421 is selected.

The CPU utilization graph 424 prides a graphical representation of the percentage utilization of the router CPU.

As further illustrated by menu 601, button 421 is selected by the network manager to obtain information on the router profile, to establish a Telnet connection with the router, or to write the current router configuration to a non-volatile memory.

Figure 7:
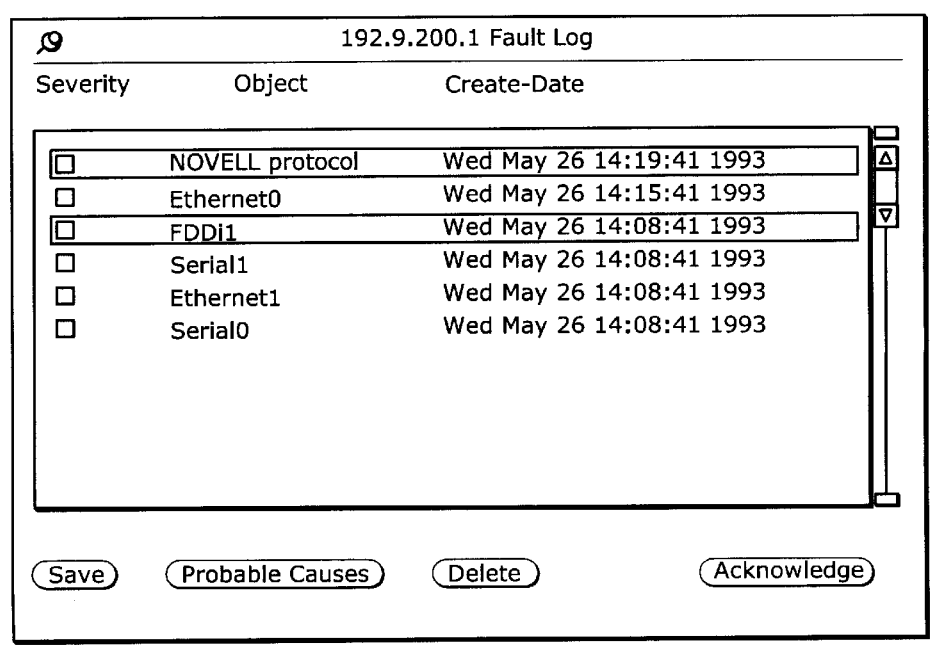
FIG. 7 is an illustration of a fault log window as may be displayed by the network management system of the described embodiment.
Figure 8:
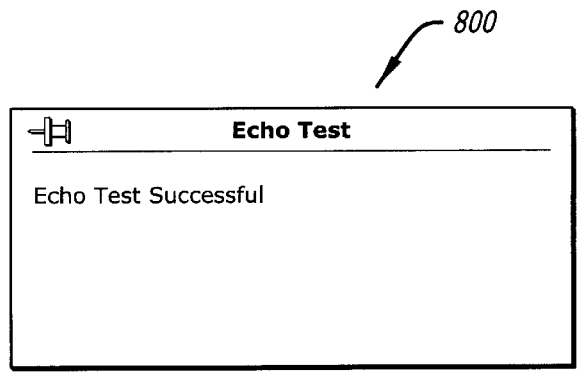
FIG. 8 is an illustration of a echo test window as may be displayed by the network management system of the described embodiment.
Figure 9:
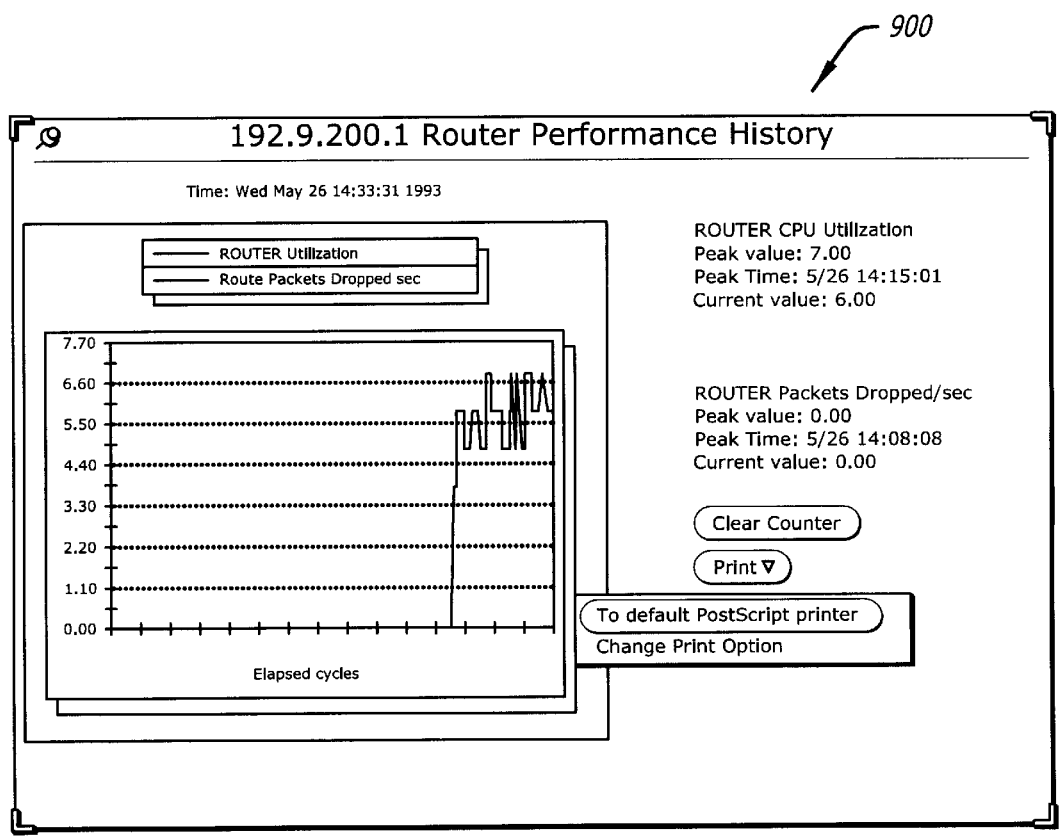
FIG. 9 is an illustration of a router performance history window as may be displayed by the network management system of the described embodiment.
Figure 10:
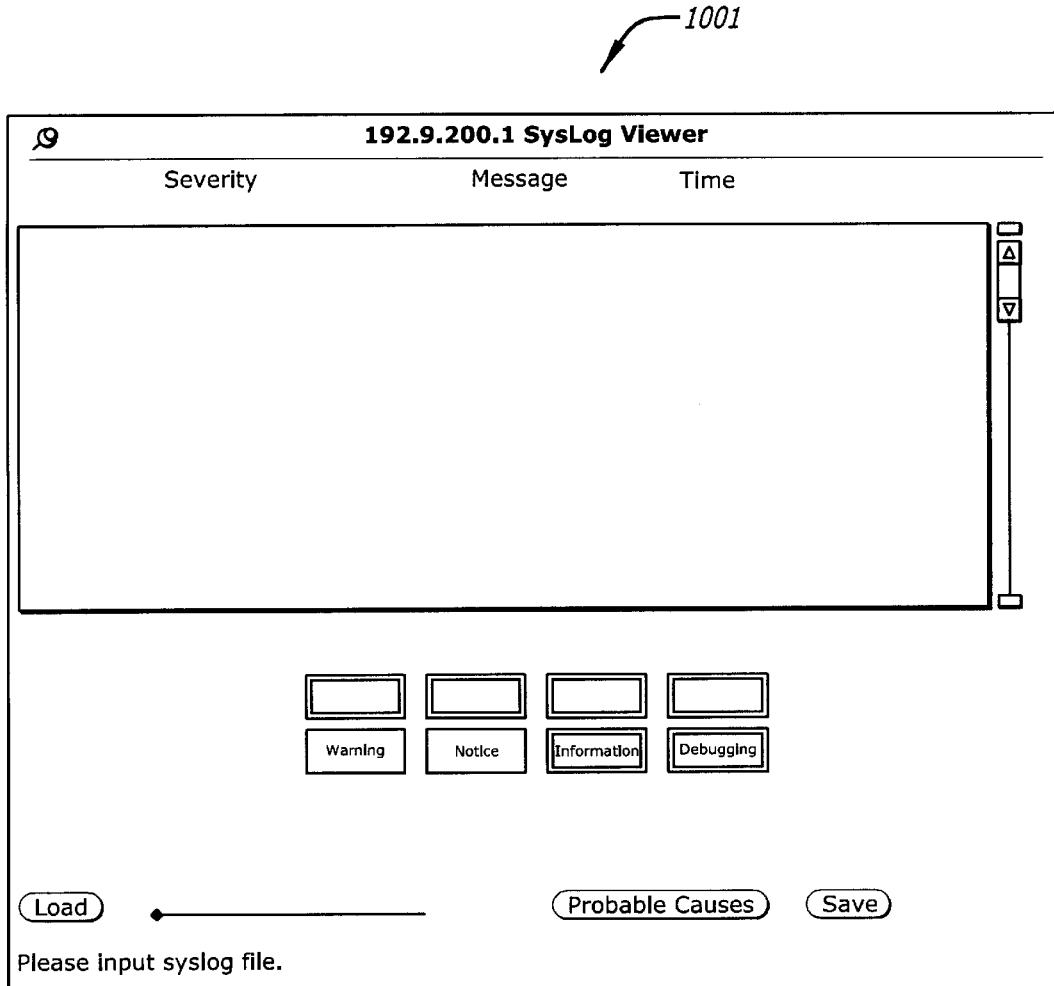
FIG. 10 is an illustration of a SysLog viewer window as may be displayed by the network management system of the described embodiment.
Figure 11:
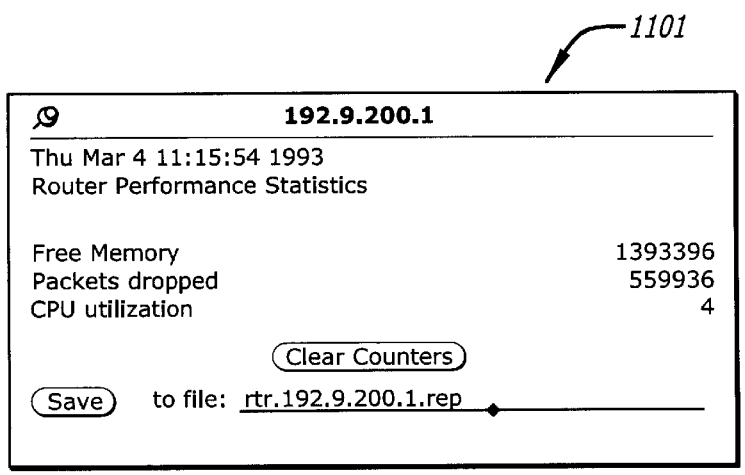
FIG. 11 is an illustration of a performance statistics window as may be displayed by the network management system of the described embodiment.

Fault button 422 may be selected to display a menu of options including display of the router fault log 700 which is shown in greater detail with reference to FIG. 7; allowing performance of an echo test (see FIG. 8 showing echo test window 800), and displaying the SysLog window 1001.

The fault log 700 lists the last 100 fault color changes for the router. The most recent color change is at the top of the list and the remaining are in time-descending order.

The echo test utilizes the UNIX ping command to see if the router is responding to polls. This test is especially useful for the system manager where there has been a number of timeouts of responses to various SNMP requests addressed to the specified router. Generally speaking, the echo test is designed to provide confirmation of the availability of the router. The echo test window 800 displays the result of the echo test.

The SysLog window 1001 provides the syslog file messages for the selected router.

Finally, the performance button 423 may be selected to cause display of a router performance statistics window 1101, performance history window 900, showing information on performance by protocol and interface and showing active running processes on the router. As has been stated above, the historical information for providing the performance history display and fault log information is stored locally at the client computer.

Detailed description of the protocol area 402 on the main display 400

In the protocol area 402, a row of information is provided for each of the protocols available on the selected router. The protocols available on the router were discovered as discussed in connection with FIG. 3(c). In the exemplary main window 400, there are two rows of information displayed in the protocol area 402 indicating the selected router has those two protocols installed. As shown, the router has the internet protocol (IP) and the Novell Internet Packet Exchange (IPX) protocols installed.

The protocol area 402, similar to the router area 401, includes 3 buttons 431–433 and a graph 434. Protocol button 431 displays a menu of options to obtain information related to the particular protocol. The menu varies in the described embodiment dependent on the particular protocol. For example, the specific menu selections provided for the Internet Protocol (IP) are as follows:

Show ICMP (the ICMP window 1201 is provided by FIG. 12)

Figure 13:
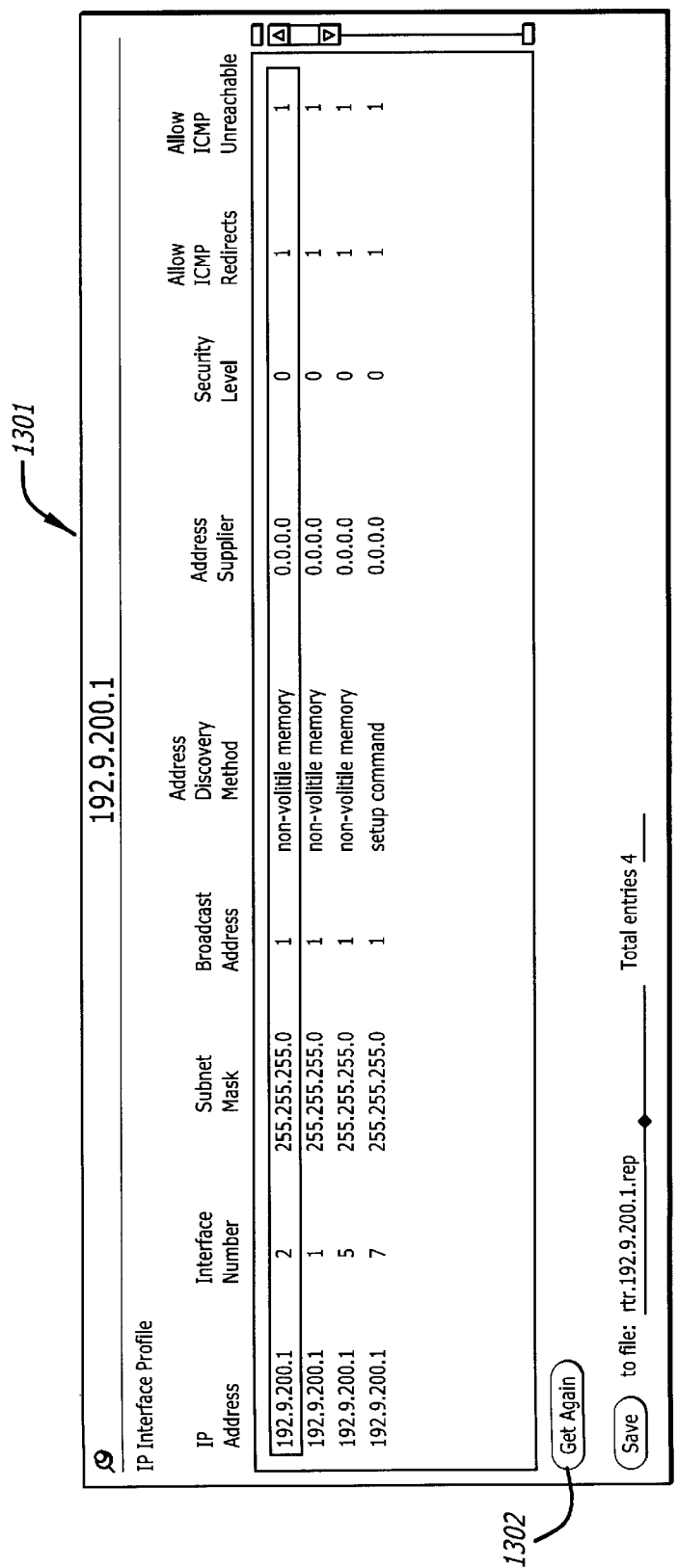
FIG. 13 is an illustration of an interface profile window as may be displayed by the network management system of the described embodiment.

Show IP interface profiles (the interface profile window 1301 is shown by FIG. 13). As one feature of the IP profile window 1301, the most recent IP interface profiles may be obtained by clicking on the "Get Again" button 1202.

Show routing tables (the routing table window 1401 is provided by FIG. 14). Importantly, the routing table window 1401 provides for updating the routing tables as well as displaying the routing tables using the add route button 1403, the delete route button 1404, and the change route button 1405. The changes made by the network manager using the buttons 1403–1405 do not take effect until the network manager clicks on the apply button 1406. Clicking the apply button 1406 causes the network management system to have the router update its routing tables. The routing table window also provides a "Get Again" button which obtains the most recent routing table from the router.

Show the address resolution protocol (ARP) table. The ARP table provides buttons that are identical in name and functionality to the routing table window 1401.

and, if the router supports Cisco systems private MIB, then the following menu selection is also available:

Show accounting table.

Using the fault button 432, a menu is provided which allows selection of either fault history or current statistics similar to the history and statistics windows 901 and 1101 provided for the router.

Finally, using the performance button 433 provides a menu for selection of statistics, history, performance by protocol, performance by interface or display of active processes.

The graph 434 provides a graph show protocol performance as a percentage of maximum from 0 to 100%.

Detailed description of the interface area 403 on the main display 400

The interface area 403 displays one row for each interface present on the selected router. Again, similar to the router area 401, each row includes 3 buttons 441–443 and a graph 444.

In the described embodiment, the interface configuration buttons (e.g., button 441) are displayed as symbols which represent the type of interface shown by the particular row. There may be more than one of any particular type of interface on a particular router and, therefore, there may be more than one row for each interface type (i.e., there is one row per interface, not one row per interface type.) The symbols used for the buttons to represent the various types of interfaces are given in Table 2 below:

TABLE 2

| Symbol | Represent an interface for: |
|---|---|
| Monitors in a circle | Token Ring |
| Monitors in a straight line | Ethernet |
| Telephone | Serial line |
| Double Circle | FDDI |
| Circular Arrow | Loop back |

The format for the main window 400 provides room for display of up approximately 11 interfaces. If the number of interfaces supported by the router exceeds the maximum number displayable on the main window 400, the window 400 automatically converts to a two column format allowing display of up to 32 different interfaces, with odd-numbered interfaces displayed in the left-hand column and even-numbered interfaces displayed on the right-hand column.

Clicking on an interface configuration button, such as button 441, causes display of the interface configuration window 1501.

Figure 17:
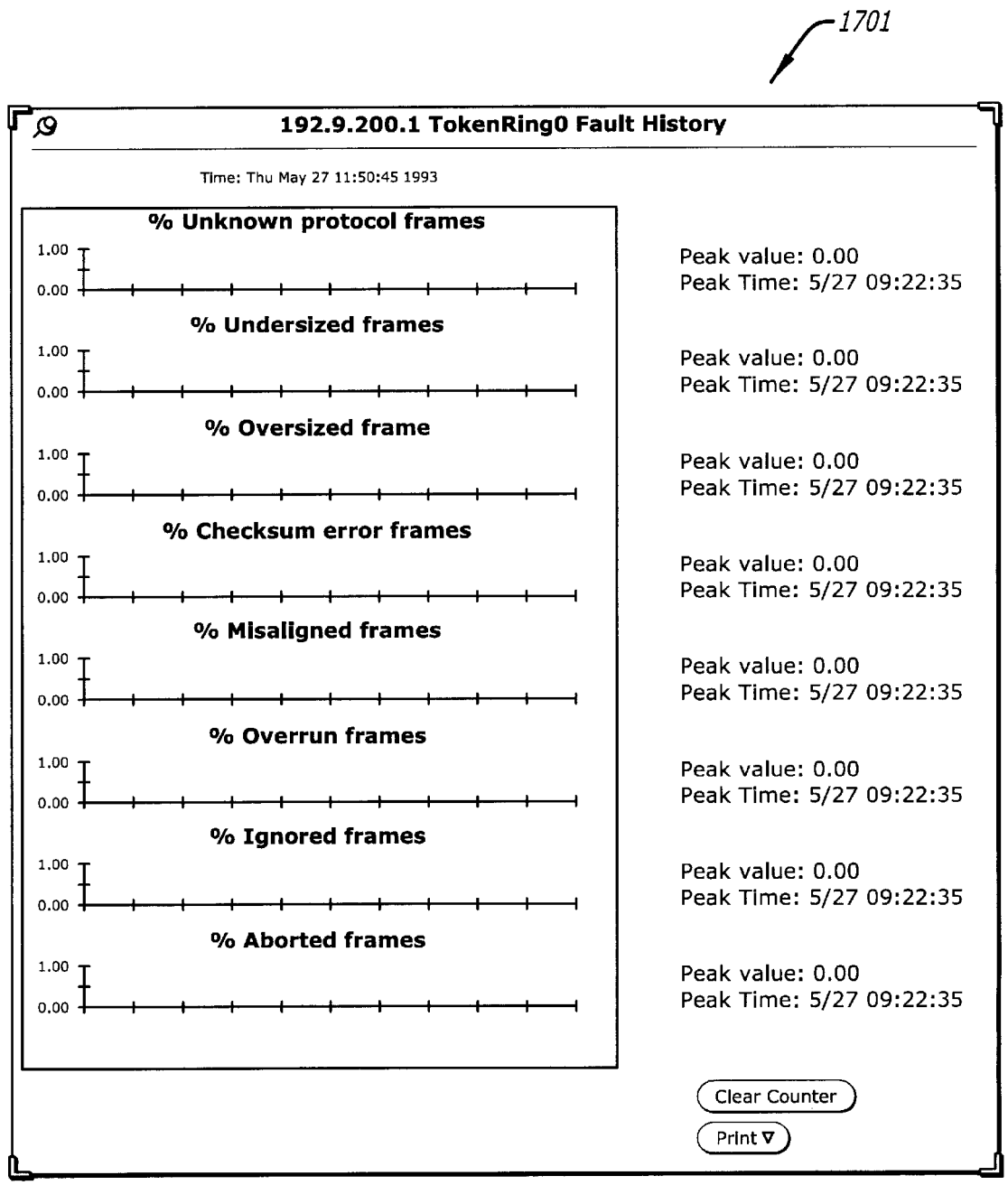
FIG. 17 is an illustration of an interface fault history window as may be displayed by the network management system of the described embodiment.
Figure 19:
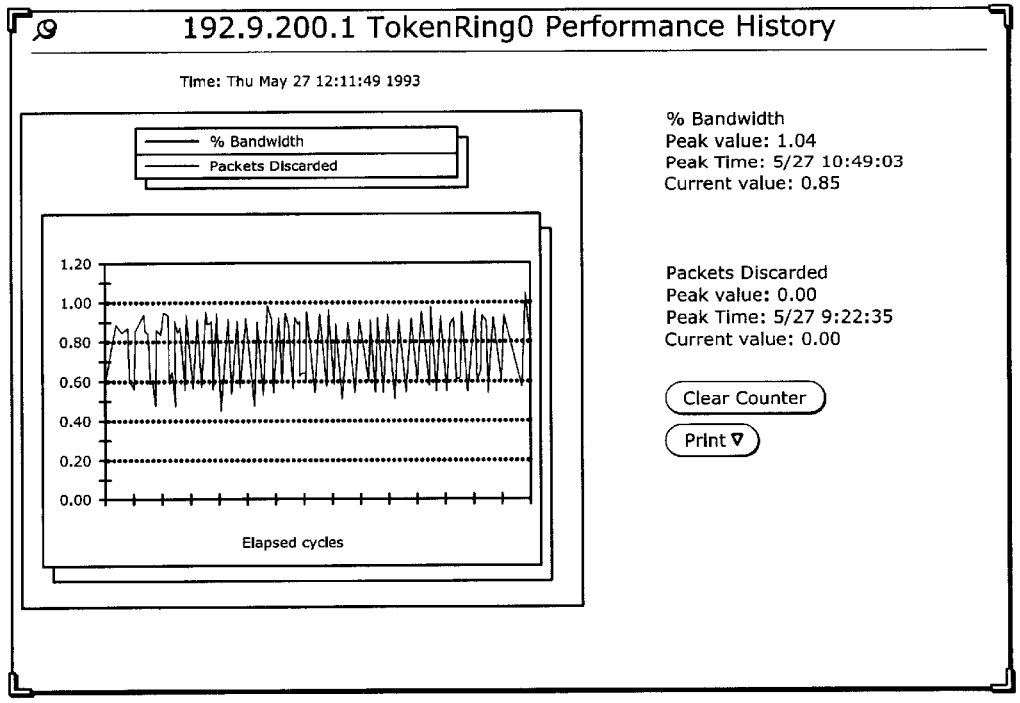
FIG. 19 is an illustration of an interface performance history window as may be displayed by the network management system of the described embodiment.
Figure 20:
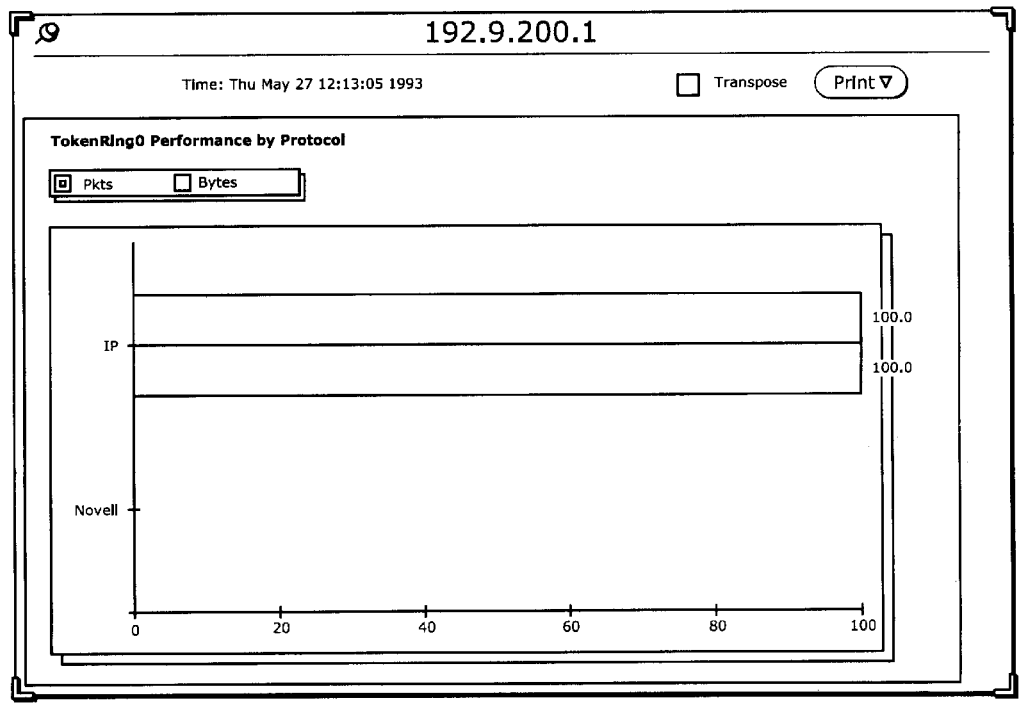
FIG. 20 is an illustration of an interface performance by protocol window as may be displayed by the network management system of the described embodiment.

Clicking on an interface faults button, such as button 442, causes display of a menu which allow selection of either fault statistics information or fault history information for the interface. The interface fault statistics window 1601 is shown by FIG. 16. The interface fault history window 1701 is shown by FIG. 17.

Clicking on an interface performance button, such as button 443, causes display of a menu which allows for selection of either an interface performance statistics window 1801, an interface performance history window 1901 or for display of performance information by protocol in a window such as window 2001.

Graph 444 provides a graphical display of the interface performance.

VII. Display of a Logical View of a Router—Setup Window

As was discussed in connection with FIG. 4, the setup window 500 is accessible via the main window 400 using button 405. The setup window 501 provides the network manager with the ability to configure the router network management session including configuring the client-server poll time interval as has been discussed above and configuring the SNMP timeout interval. In addition, the network manager may configure the threshold points for changing buttons on the main menu from the normal color to the warning color to the critical color (i.e., green to yellow to red). Finally, the setup window 500 allows for providing a read community string, a write community string, a Telnet password, a file name to save configuration information to, a file name to load configuration information from, and a file name to load Telnet commands from.

VIII. Telnet Interface

Although significant information is available from routers using the SNMP protocol, certain key diagnostic information is not available through this protocol. Such information may be retrieved using Telnet. Examples of such information includes:

IPX routing tables

AppleTalk routing tables

Source routing bridge information.

As one important feature of the present invention, the described embodiment provides for the ability of the network administrator to create and automate execution of complex Telnet commands. The Telnet commands may then be added as buttons in the various pop-up menus in the router network management system. In addition, as has been described in connection with menu 601, a Telnet connection may be established including a window for directly issuing Telnet commands.

Generally, Telnet commands are added to menus as follows:

(1) The Telnet configuration file is opened for editing. For example, using the SunOS operating system, the file may be opened using the "vi" editor. In the described embodiment, the Telnet configuration file is named "ev_rtr.Telnetcfg" and is opened for editing by the "vi" editor using the command:

"vi ev_rtr.Telnetcfg".

(2) Any number of comment lines may be entered in the Telnet configuration file. Typically, comments are entered prior to the Telnet commands.

(3) Next, the router ID and router's software version are provided.

(4) Next, the protocol or interface name, menu name for displaying the button, item and Telnet command are entered For example, using the syntax of the described embodiment, the following is the syntax to be used:

$ [button row] [button column] [menu item] @[Telnet command] where:

"$" identifies the line as making a new menu button item;

"button row" identifies the row in the main window 400 on which the button will be added—i.e., Router, particular protocol (IP, DecNet, XNS, AppleTalk, Novell, Vines) or interface;

"button column" identifies the column in the main window 400 on which the button will be added—i.e., Configuration, Fault, Performance;

"menu string" identifies the character string to be added to the menu;

"@" is a delimiter to indicate the start of the Telnet command; and

"Telnet Command" is the actual Telnet command to be executed responsive to selection of the new button.

For example, the following entry causes a new button to be added to the IP performance menu (which is selectable by the user, as has been discussed, by clicking on button 433 in the IP row of the protocol area 402. The new button will appear in the menu with the text string "Show Traffic Statistics". The command, when selected by the network manager will issue the Telnet command "sh ip traffic" to the selected router. The syntax for the entry is as follows:

$ IP Performance Show Traffic Statistics @sh ip traffic (5) Multiple commands may be added to menu by repeating steps 2–4;

(6) The Telnet configuration is then saved and closed;

(7) Next, on the main window 400, the network manager clicks the setup button 405 to obtain access to the setup window 500;

(8) On the setup window, the network manager enters the name of the configuration file in the space indicated (i.e., the space at the bottom of window 500 labeled "from file:" next to the "Load Telnet Commands" button.

(9) The Telnet commands are then loaded into the system by clicking the "Load Telnet Commands" button on the setup window 500. The "menu string" for the new commands will then appear on the designated menus dynamically without need to restart the system.

Thus, what has been disclosed is a method and apparatus which provides for management of a router or the like in a data network.

What is claimed is:

1. A data communication network comprising:
   (a) a first local area network for allowing communication of messages;
   (b) a second local area network for allowing communication of messages;
   (c) a first station coupled in communication with said first local area network;
   (d) a second station coupled in communication with said second local area network;
   (e) a router interconnecting said first local area network and said second local area network; and
   (f) a device for monitoring said router, said device coupled in communication with said router to obtain information from said router, said device comprising:
      (i) a processor for processing said information received from said router, said information comprising available protocols on said router;
      (ii) a display for displaying representations of said information received from said router, said representations comprising graphical representation of said information.

2. The data communications network as recited by claim 1 wherein said information from said router comprises configuration information.

3. The data communications network as recited by claim 1 wherein said information received from said router comprises fault information.

4. The data communications network as recited by claim 1 wherein said information received from said router comprises performance information.

5. The data communications network as recited by claim 1 wherein said information from said router comprises interface information.

6. A monitoring device for obtaining information from a router in a data network, said router for interconnecting local area networks, said device comprising:
   (a) a port for coupling with a communication media, said port allowing communication between said monitoring device and said remote router over said communication media;
   (b) a memory for storing information received from said router, said information comprising available protocols on said router; and
   (c) display means for displaying representations of said information, said display means displaying said representations in the form of graphical views of at least portions of said information.

7. The device as recited by claim 6 wherein said displayed information comprises configuration information.

8. The device as recited by claim 6 wherein said displayed information comprises fault information.

9. The device as recited by claim 6 wherein said displayed information comprises performance information.

10. The device as recited by claim 6 wherein said displayed information comprises interface information.

11. A computer-implemented method for monitoring routers in a data network, said method comprising the steps of:
    (a) identifying a remote router in said data network by providing router identifying information;
    (b) after identifying said router, polling said router to obtain information on said router over said data network;
    (c) a station on said network receiving responses from said router responsive to said polling step;
    (d) displaying a graphical representation of said router based on said responses, said graphical representation comprising available protocols and interface information on said router.

12. The method as recited by claim 11 wherein said station is a server computer.

13. The method as recited by claim 11 wherein said polling step comprises the step of determining which of a plurality of protocols are available on said router, said step of determining which of a plurality of protocols are available comprising the substeps of:
    (a) polling said router for information on a first protocol;
    (b) if said router responds with information on said first protocol, displaying information on said first protocol as part of said graphical representation; and
    (c) if said router responds with an error message, assuming that said first protocol is not supported by said router.

14. The method as recited by claim 11 wherein said graphical representation comprises fault information.

15. The method as recited by claim 11 wherein said graphical representation comprises performance information.

16. A device for obtaining information from a router in a data network, the router for interconnecting local area networks, the device comprising:
    a) means for coupling with a communication media and allowing communication between the device and the router over the communication media;
    b) means for storing information received from the router, the information comprising available protocols on the router; and
    c) means for displaying representations of the information, the means for displaying the representations in the form of logical views of at least portions of the information.

17. The device as recited by claim 16 wherein the displayed information comprises configuration information.

18. The device as recited by claim 16 wherein the displayed information comprises fault information.

19. The device as recited by claim 16 wherein the displayed information comprises performance information.

20. The device as recited by claim 16 wherein the displayed information comprises protocol information.

21. The device as recited by claim 16 wherein the displayed information comprises interface information.

22. A machine-readable medium comprising at least one instruction to monitor routers in a data network, which when executed by a processor, causes the processor to perform operations comprising:
    (a) identifying a router in the data network by providing router identifying information;
    (b) polling the router to obtain information on the router over the data network;
    (c) a station on the network receiving responses from the router responsive to the polling step;
    (d) displaying a graphical representation of the router based on the responses, the graphical representation comprising available protocol and interface information on the router.

23. The machine-readable medium as recited by claim 22 wherein the logical representation is displayed on a client computer.

24. The machine-readable medium as recited by claim 22 wherein the operation of polling comprises one or more instructions for determining which of a plurality of protocols are available on the router, the one or more instructions, when executed by the processor, causes the processor to perform operations comprising:

(a) polling the router for information on a first protocol;

(b) if the router responds with information on the first protocol, displaying information on the first protocol as part of a logical representation; and (c) if the router responds with an error message, assuming that the first protocol is not supported by the router.

25. The method as recited by claim 22 wherein the graphical representation comprises fault information.

26. The method as recited by claim 22 wherein the graphical representation comprises performance information.

* * * * *